US009367121B2

(12) United States Patent
Huang et al.

(10) Patent No.: US 9,367,121 B2
(45) Date of Patent: Jun. 14, 2016

(54) UNIVERSAL SERIAL BUS USB 3.0 COMPATIBLE HOST WITH LOWER OPERATION POWER CONSUMPTION AND METHOD FOR REDUCING OPERATION POWER CONSUMPTION OF A USB COMPATIBLE 3.0 HOST

(71) Applicant: Etron Technology, Inc., Hsinchu (TW)

(72) Inventors: Chih-Hung Huang, Taipei (TW); Chien-Cheng Kuo, Taipei (TW); Shih-Min Hsu, Taipei (TW)

(73) Assignee: eEver Technology, Inc., Neihu Dist., Taipei (TW)

( * ) Notice: Subject to any disclaimer, the term of this patent is extended or adjusted under 35 U.S.C. 154(b) by 180 days.

(21) Appl. No.: 13/659,879

(22) Filed: Oct. 24, 2012

(65) Prior Publication Data
US 2013/0205148 A1    Aug. 8, 2013

(30) Foreign Application Priority Data
Feb. 7, 2012  (TW) .............................. 101103930 A

(51) Int. Cl.
G06F 1/00      (2006.01)
G06F 1/32      (2006.01)

(52) U.S. Cl.
CPC ............. *G06F 1/3278* (2013.01); *Y02B 60/126* (2013.01)

(58) Field of Classification Search
CPC .. G06F 13/4081; G06F 1/3278; Y02B 60/126
USPC ................ 710/305, 110, 60, 15, 10, 14, 300; 713/100, 323, 320, 501, 500, 300, 321, 713/324; 235/492
See application file for complete search history.

(56) References Cited

U.S. PATENT DOCUMENTS

| 6,012,103 A * | 1/2000 | Sartore .................. G06F 13/10 710/10 |
| 6,839,778 B1 * | 1/2005 | Sartore ............... G06F 13/4081 710/14 |
| 8,073,985 B1 * | 12/2011 | Ni ....................... G06F 12/1416 439/660 |
| 8,095,698 B2 * | 1/2012 | Santhanam et al. ............ 710/15 |
| 8,719,475 B2 * | 5/2014 | Ma et al. ...................... 710/110 |
| 2006/0000917 A1 * | 1/2006 | Kim et al. ..................... 235/492 |

(Continued)

FOREIGN PATENT DOCUMENTS

| TW | 201133246 | 10/2011 |
| TW | 201133246 A1 | 10/2011 |
| WO | 2010132938 A1 | 11/2010 |

*Primary Examiner* — Aurel Prifti
(74) *Attorney, Agent, or Firm* — Winston Hsu; Scott Margo

(57) ABSTRACT

A USB 3.0 compatible host with low power consumption includes a super speed circuit, a non-super speed circuit, and a control module. The super speed circuit transmits data at a first transmission speed and the non-super speed circuit transmits data at a second transmission speed, a third transmission speed, or a fourth transmission speed wherein the first transmission speed is faster than the second transmission speed, the third transmission speed, and the fourth transmission speed. Further, the control module is coupled to the super speed circuit and the non-super speed circuit for determining to turn on or off the super speed circuit of the USB 3.0 compatible host, during the USB 3.0 compatible host being connected to a USB 3.0 compatible peripheral device, based on whether transmission data quantity between the USB 3.0 compatible host and the USB 3.0 compatible peripheral device is greater than a predetermined value.

14 Claims, 6 Drawing Sheets

(56) References Cited

U.S. PATENT DOCUMENTS

| | | | |
|---|---|---|---|
| 2006/0085653 A1* | 4/2006 | Bollinger et al. | 713/300 |
| 2008/0046713 A1* | 2/2008 | Barragy et al. | 713/100 |
| 2009/0199031 A1* | 8/2009 | Zhang et al. | 713/323 |
| 2009/0228730 A1* | 9/2009 | Chin | G06F 1/32 713/324 |
| 2009/0228733 A1* | 9/2009 | Wang | 713/500 |
| 2009/0307476 A1* | 12/2009 | Khatri et al. | 713/2 |
| 2010/0005327 A1* | 1/2010 | Murata | 713/320 |
| 2011/0131437 A1* | 6/2011 | Shimazaki | 713/323 |
| 2011/0179201 A1* | 7/2011 | Monks | G06F 13/387 710/60 |
| 2011/0231685 A1* | 9/2011 | Huang et al. | 713/321 |
| 2012/0017101 A1* | 1/2012 | So et al. | 713/300 |
| 2012/0059964 A1* | 3/2012 | Foster | G06F 1/12 710/300 |
| 2012/0059965 A1* | 3/2012 | Foster | 710/305 |
| 2012/0084594 A1* | 4/2012 | Chen et al. | 713/501 |
| 2012/0151239 A1* | 6/2012 | Wang | G06F 1/3203 713/324 |
| 2013/0246667 A1* | 9/2013 | Markel | G06F 13/4081 710/15 |

* cited by examiner

UNIVERSAL SERIAL BUS USB 3.0 COMPATIBLE HOST WITH LOWER OPERATION POWER CONSUMPTION AND METHOD FOR REDUCING OPERATION POWER CONSUMPTION OF A USB COMPATIBLE 3.0 HOST

BACKGROUND OF THE INVENTION

1. Field of the Invention

The present invention relates to a USB 3.0 host with low power consumption and a method thereof, and particularly to a USB 3.0 host and a method thereof that can reduce power consumption of the USB 3.0 host according to a predetermined condition between the USB 3.0 host and a USB peripheral device.

2. Description of the Prior Art

Please refer to FIG. 1. FIG. 1 is a diagram illustrating a USB 3.0 host 100 connected to a USB 3.0 peripheral device 110 through a composite cable 120. As shown in FIG. 1, a physical layer of the USB 3.0 host 100 is divided into a super speed circuit 102 which supports a super speed transmission (USB 3.0), and a non-super speed circuit 104 which supports a non-super speed transmission (USB 2.0), where the non-super speed circuit 104 further includes a high speed circuit 1042, a full speed circuit 1044, and a low speed circuit 1046. Similarly, the USB 3.0 peripheral device 110 (not including a USB 3.0 hub) also has a super speed circuit 112 which supports the super speed transmission, and a non-super speed circuit 114 which supports the non-super speed transmission. The super speed circuit 102 of the USB 3.0 host 100 communicates with the super speed circuit 112 of the USB 3.0 peripheral device 110 through a first connection line 122 of a composite cable 120, and the non-super speed circuit 104 of the USB 3.0 host 100 communicates with the non-super speed circuit 114 of the USB 3.0 peripheral device 110 through a second connection line 124 of the composite cable 120. It should be noted that the super speed circuit 102 and the non-super speed circuit 104 of the USB 3.0 host 100 do not simultaneously communicate with the super speed circuit 112 and the non-super speed circuit 114 of the USB 3.0 peripheral device 110 through the first connection line 122 and the second connection line 124 of the composite cable 120, respectively. In addition, a non-USB 3.0 peripheral device 130 only has a non-super speed circuit (not shown in FIG. 1) which supports the non-super speed transmission. Therefore, the non-super speed circuit of the non-USB 3.0 peripheral device only communicates with the non-super speed circuit 104 of the USB 3.0 host 100 through the second connection line 124 of the composite cable 120.

As shown in FIG. 1, in the prior art, when the USB 3.0 peripheral device 110 is connected to the USB 3.0 host 100, regardless of transmission data quantity between the USB 3.0 host 100 and the USB 3.0 peripheral device 110 and a power management policy of the USB 3.0 host 100, the super speed circuit 102 and the non-super speed circuit 104 of the USB 3.0 host 100 are always turned on. That is to say, the USB 3.0 host 100 does not determine to utilize the super speed circuit 102 to connect the super speed circuit 112 of the USB 3.0 peripheral device 110 and turn off the non-super speed circuit 104, or to utilize the non-super speed circuit 104 to connect the non-super speed circuit 114 of the USB 3.0 peripheral device 110 and turn off the super speed circuit 102 according to the transmission data quantity between the USB 3.0 host 100 and the USB 3.0 peripheral device 110 and the power management policy of the USB 3.0 host 100. Thus, the USB 3.0 host 100 unnecessarily wastes much power consumption.

SUMMARY OF THE INVENTION

An embodiment provides a USB 3.0 host with low power consumption. The USB 3.0 host includes a super speed circuit, a non-super speed circuit, and a control module. The super speed circuit is used for transmitting data at a first transmission speed. The non-super speed circuit is used for transmitting data at a second transmission speed, a third transmission speed, or a fourth transmission speed, where the first transmission speed is higher than the second transmission speed, the third transmission speed, and the fourth transmission speed. The control module is coupled to the super speed circuit and the non-super speed circuit for controlling the super speed circuit or the non-super speed circuit to perform data transmission with a USB peripheral device according to a predetermined condition, and turning-on or turning-off of the super speed circuit and the non-super speed circuit.

Another embodiment provides a method for reducing power consumption of a USB 3.0 host. The method includes connecting a USB peripheral device to a USB 3.0 host; and a control module controlling a super speed circuit of the USB 3.0 host or a non-super speed circuit of the USB 3.0 host to perform data transmission with a USB peripheral device, and turning on or turning off the super speed circuit and the non-super speed circuit according to a predetermined condition.

The present invention provides a USB 3.0 host with low power consumption and a method for reducing power consumption of the USB 3.0 host. The USB 3.0 host and the method determine a connection between a USB peripheral device (a USB 3.0 peripheral device) and the USB 3.0 host to be a super speed transmission connection or a non-super speed transmission connection according to transmission data quantity between the USB peripheral device (the USB 3.0 peripheral device) and the USB 3.0 host, or according to the transmission data quantity between the USB peripheral device (the USB 3.0 peripheral device) and the USB 3.0 host, and switching transmission loss meeting a power management policy. In addition, when a non-super speed circuit of the USB peripheral device (the USB 3.0 peripheral device) is connected to a non-super speed circuit of the USB 3.0 host, a super speed circuit of the USB 3.0 host is turned off; similarly, when a super speed circuit of the USB peripheral device (the USB 3.0 peripheral device) is connected to the super speed circuit of the USB 3.0 host, the non-super speed circuit of the USB 3.0 host is turned off. Thus, the USB 3.0 host can save much unnecessary power consumption.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
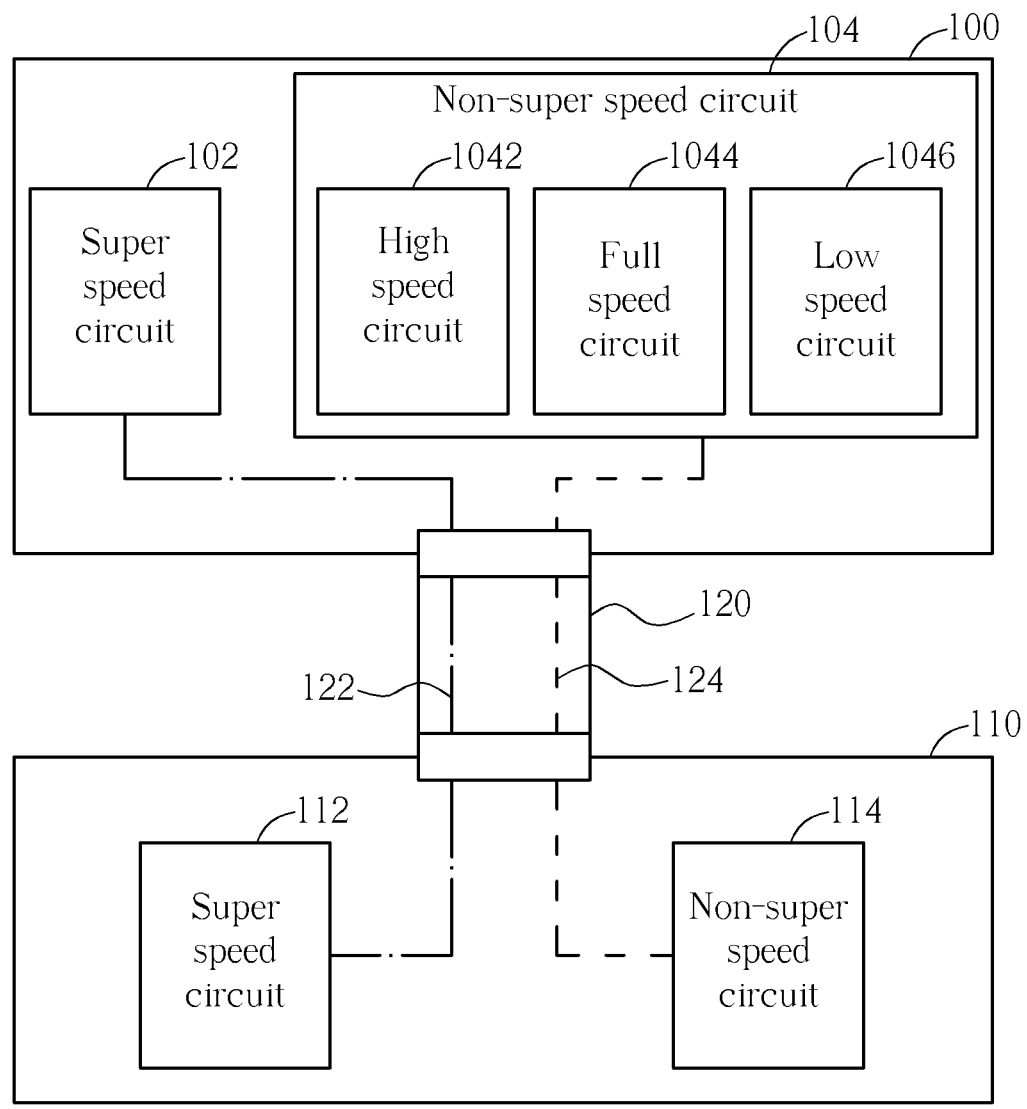
FIG. 1 is a diagram illustrating a USB 3.0 host connected to a USB 3.0 peripheral device through a composite cable.
Figure 2:
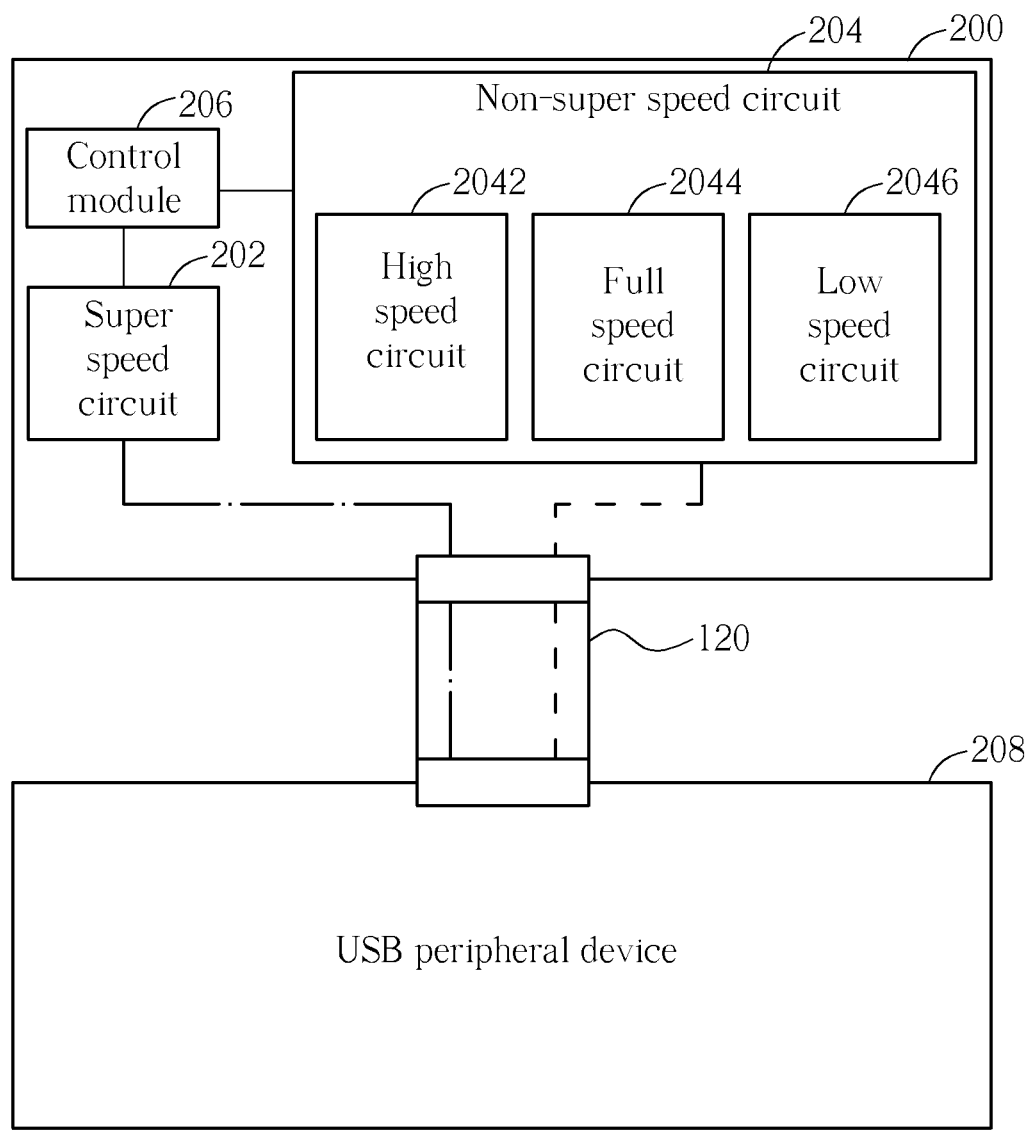
FIG. 2 is a diagram illustrating a USB 3.0 host with low power consumption according to an embodiment.

Please refer to FIG. 2. FIG. 2 is a diagram illustrating a USB 3.0 host 200 with low power consumption according to an embodiment. The USB 3.0 host 200 includes a super speed circuit 202, a non-super speed circuit 204, and a control module 206. The super speed circuit 202 is used for transmitting data at a first transmission speed. The non-super speed circuit 204 includes a high speed circuit 2042, a full speed circuit 2042, and a low speed circuit 2042. Therefore, the non-super speed circuit 204 can be used for optionally transmitting data at a second transmission speed (corresponding to the high speed circuit 2042), a third transmission speed (corresponding to the full speed circuit 2044), or a fourth transmission speed (corresponding to the low speed circuit 2046), where the first transmission speed is higher than the second transmission speed, the third transmission speed, and the fourth transmission speed. The control module 206 is coupled to the super speed circuit 202 and the non-super speed circuit 204 for controlling the super speed circuit 202 or the non-super speed circuit 204 to perform data transmission with a USB peripheral device 208 according to a predetermined condition, and turning-on or turning-off of the super speed circuit 202 and the non-super speed circuit 204. In addition, the control module 206 can be implemented through hardware, software, or firmware.

Figure 3A:
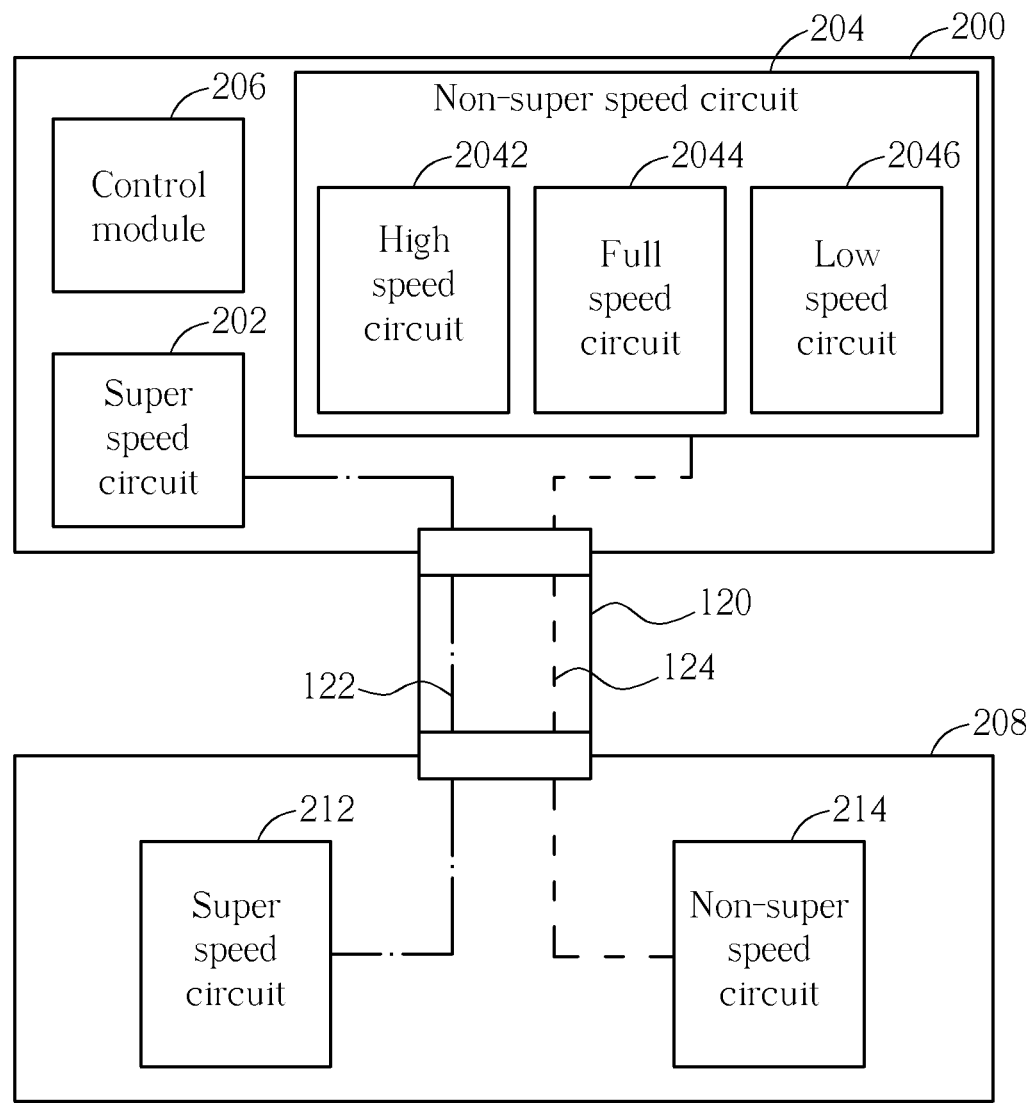
FIG. 3A is a diagram illustrating the USB peripheral device being a USB 3.0 peripheral device.

Please refer to FIG. 3A. FIG. 3A is a diagram illustrating the USB peripheral device 208 being a USB 3.0 peripheral device. As shown in FIG. 3A, the USB peripheral device 208 includes a super speed circuit 212, and a non-super speed circuit 214. In addition, the super speed circuit 202 of the USB 3.0 host 200 can communicate with the super speed circuit 212 of the USB peripheral device 208 through a first connection line 122 of a composite cable 120, the non-super speed circuit 204 of the USB 3.0 host 200 can communicate with the non-super speed circuit 214 of the USB peripheral device 208 through a second connection line 124 of the composite cable 120, and the super speed circuit 202 and the non-super speed circuit 204 of the USB 3.0 host 200 do not simultaneously communicate with the super speed circuit 212 and the non-super speed circuit 214 of the USB peripheral device 208 through the first connection line 122 and the second connection line 124 of the composite cable 120, respectively.

As shown in FIG. 3A, the control module 206 controls the super speed circuit 202 to perform the data transmission with the super speed circuit 212 of the USB peripheral device 208 according to a USB 3.0 specification when the USB 3.0 host 200 is initially connected to the USB peripheral device 208. The control module 206 continuously controls the super speed circuit 202 to perform the data transmission with the super speed circuit 212 of the USB peripheral device 208 and turns off the non-super speed circuit 204 when transmission data quantity between the USB 3.0 host 200 and the USB peripheral device 208 is greater than a predetermined value. The control module 206 first turns on the non-super speed circuit 204, then turns off the super speed circuit 202, and controls the non-super speed circuit 204 to perform the data transmission with the non-super speed circuit 214 of the USB peripheral device 208 when the transmission data quantity between the USB 3.0 host 200 and the USB peripheral device 208 is lower than or equal to the predetermined value. In another embodiment of the present invention, the control module 206 first turns on the non-super speed circuit 204, then turns off the super speed circuit 202, and controls the non-super speed circuit 204 to perform the data transmission with the non-super speed circuit 214 of the USB peripheral device 208 when the transmission data quantity between the USB 3.0 host 200 and the USB peripheral device 208 is lower than or equal to the predetermined value and switching transmission loss meets a power management policy. That is to say, because the control module 206 turns off the super speed circuit 202 and turns on the non-super speed circuit 204, a connection between the super speed circuit 212 of the USB peripheral device 208 and the super speed circuit 202 of the USB 3.0 host 200 is turned off; and, the USB peripheral device 208 utilizes the non-super speed circuit 214 to perform the data transmission with the non-super speed circuit 204 of the USB 3.0 host 200 according to the USB 3.0 specification. If the transmission data quantity between the USB 3.0 host 200 and the USB peripheral device 208 is lower than or equal to the predetermined value, and the switching transmission loss does not meet the power management policy, the control module 206 does not turn on the non-super speed circuit 204 and turn off the super speed circuit 202. In addition, when the control module 206 turns off the super speed circuit 202 and turns on the non-super speed circuit 204, the control module 206 can also transmit a reset signal to the USB peripheral device 208. When the USB peripheral device 208 receives the reset signal, the USB peripheral device 208 first detects whether the super speed circuit 202 of the USB 3.0 host 200 is turned on, and then detects whether the non-super speed circuit 204 of the USB 3.0 host 200 is turned on according to the USB 3.0 specification. Then, because the super speed circuit 202 is turned off, the USB peripheral device 208 determines to utilize the non-super speed circuit 214 to perform the data transmission with the non-super speed circuit 204 of the USB 3.0 host 200. In addition, after the super speed circuit 202 is turned off, the control module 206 turns on the super speed circuit 202 again, and transmits a reset signal to the USB peripheral device 208 when the transmission data quantity between the USB 3.0 host 200 and the USB peripheral device 208 is greater than the predetermined value again, or the transmission data quantity between the USB 3.0 host 200 and the USB peripheral device 208 is greater than the predetermined value again and the switching transmission loss meets the power management policy. However, when the transmission data quantity between the USB 3.0 host 200 and the USB peripheral device 208 is greater than the predetermined value again and the switching transmission loss does not meet the power management policy, the control module 206 does not turn on the super speed circuit 202 again and transmit a reset signal to the USB peripheral device 208. When the USB peripheral device 208 receives the reset signal, the USB peripheral device 208 first detects whether the super speed circuit 202 of the USB 3.0 host 200 is turned on, and then detects whether the non-super speed circuit 204 of the USB 3.0 host 200 is turned on according to the USB 3.0 specification. Then, because the super speed circuit 202 is turned on, the USB peripheral device 208 determines to utilize the super speed circuit 212 to perform the data transmission with the super speed circuit 202 of the USB 3.0 host 200, and the control module 206 turns off the non-super speed circuit 204 again.

Figure 3B:
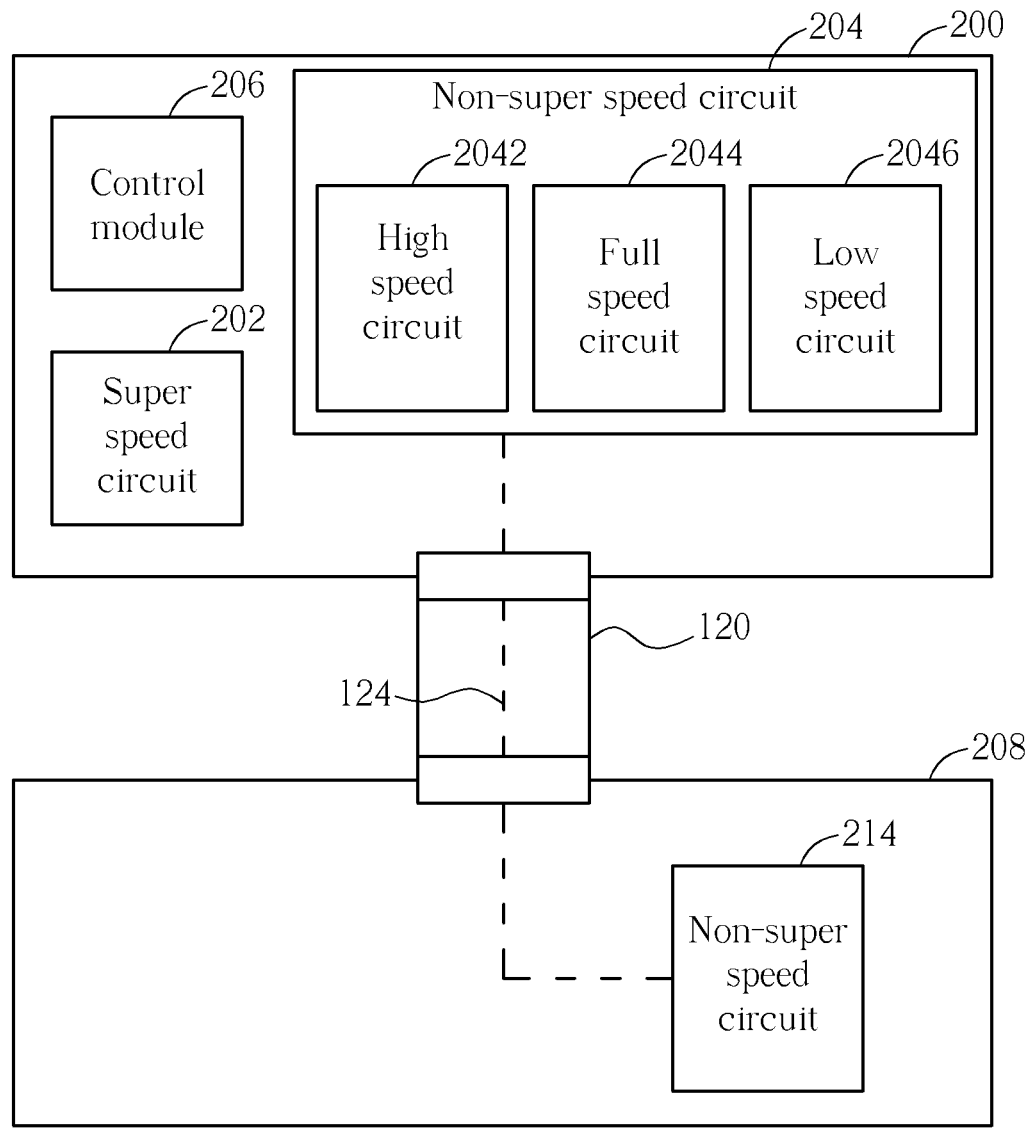
FIG. 3B is a diagram illustrating the USB peripheral device being a non-USB 3.0 peripheral device.

Please refer to FIG. 3B. FIG. 3B is a diagram illustrating the USB peripheral device 208 being a non-USB 3.0 peripheral device. As shown in FIG. 3B, the USB peripheral device 208 includes a non-super speed circuit 214. Because the USB peripheral device 208 only includes the non-super speed circuit 214, the control module 206 controls the non-super speed circuit 204 of the USB 3.0 host 200 to communicate with the non-super speed circuit 214 of the USB peripheral device 208 through the second connection line 124 of the composite cable 120, and turns off the super speed circuit 202.

Figure 4:
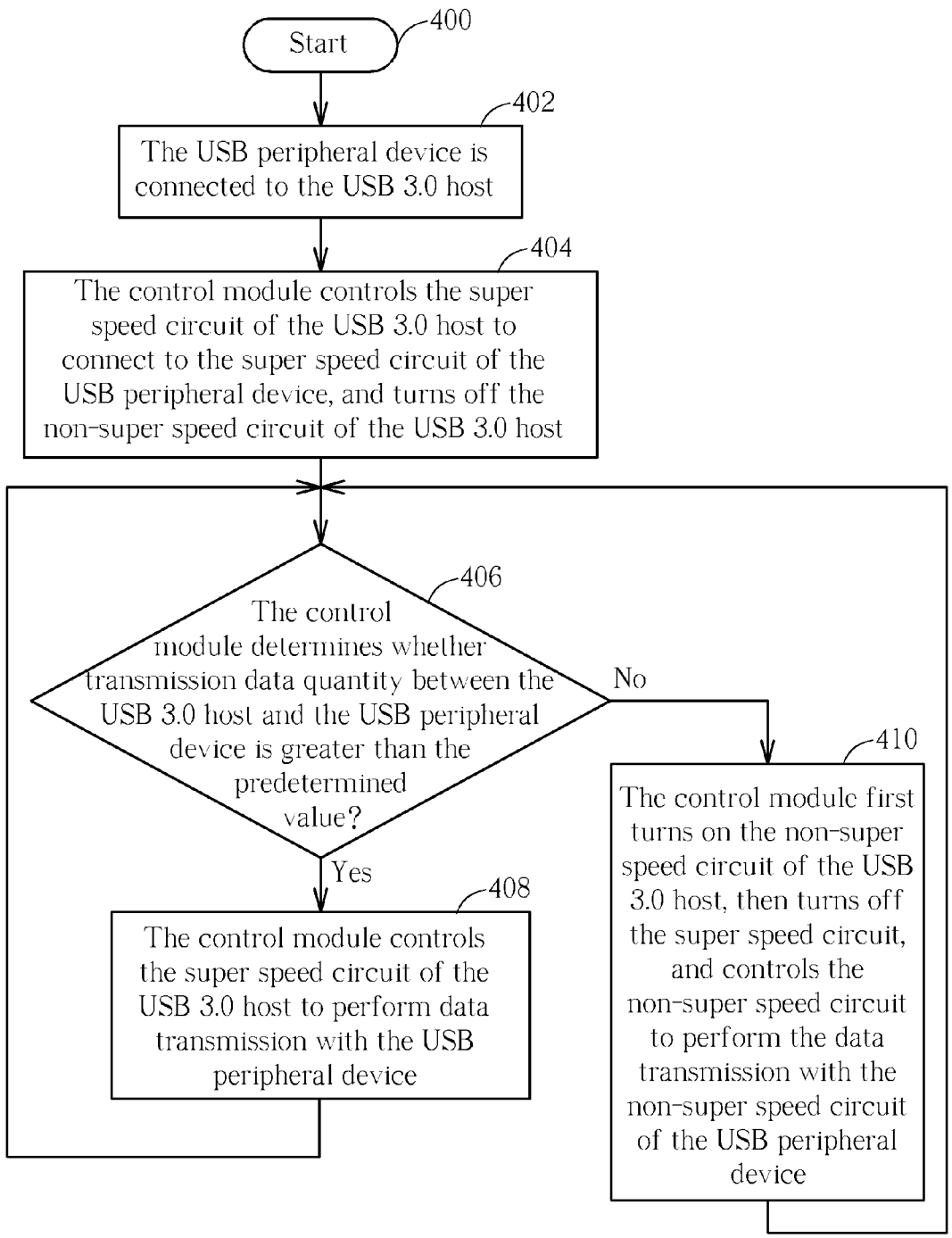
FIG. 4 is a flowchart illustrating a method for reducing power consumption of a USB 3.0 host according to another embodiment.

Please refer to FIG. 4. FIG. 4 is a flowchart illustrating a method for reducing power consumption of a USB 3.0 host according to another embodiment. The method in FIG. 4 is illustrated using the USB 3.0 host 200 and the USB peripheral device 208 in FIG. 3A. Detailed steps are as follows:

Step 400: Start.

Step 402: The USB peripheral device 208 is connected to the USB 3.0 host 200.

Step 404: The control module 206 controls the super speed circuit 202 of the USB 3.0 host 200 to connect to the super speed circuit 212 of the USB peripheral device 208.

Step 406: The control module 206 determines whether transmission data quantity between the USB 3.0 host 200 and the USB peripheral device 208 is greater than the predetermined value; if yes, go to Step 408; if no, go to Step 410.

Step 408: The control module 206 controls the super speed circuit 202 of the USB 3.0 host 200 to perform data transmission with the USB peripheral device 208; go to Step 406.

Step 410: The control module 206 first turns on the non-super speed circuit 204 of the USB 3.0 host 200, then turns off the super speed circuit 202, and controls the non-super speed circuit 204 to perform the data transmission with the non-super speed circuit 214 of the USB peripheral device 208; go to Step 406.

In Step 402, the USB peripheral device 208 is a USB 3.0 peripheral device. In Step 404, when the USB 3.0 host 200 is initially connected to the USB peripheral device 208, the control module 206 controls the super speed circuit 202 to connect to the super speed circuit 212 of the USB peripheral device 208 according to the USB 3.0 specification, where the super speed circuit 202 is used for transmitting data at the first transmission speed. In Step 408, when transmission data quantity between the USB 3.0 host 200 and the USB peripheral device 208 is greater than the predetermined value, the control module 206 controls the super speed circuit 202 of the USB 3.0 host 200 to perform the data transmission with the super speed circuit 212 of the USB peripheral device 208 and turns off the non-super speed circuit 204 of the USB 3.0 host 200. In Step 410, when the transmission data quantity between the USB 3.0 host 200 and the USB peripheral device 208 is lower than or equal to the predetermined value, the control module 206 first turns on the non-super speed circuit 204 of the USB 3.0 host 200, then turns off the super speed circuit 202, and controls the non-super speed circuit 204 of the USB 3.0 host 200 to perform the data transmission with the non-super speed circuit 214 of the USB peripheral device 208. The non-super speed circuit 204 of the USB 3.0 host 200 is used for optionally transmitting data at the second transmission speed (corresponding to the high speed circuit 2042), the third transmission speed (corresponding to the full speed circuit 2044), or the fourth transmission speed (corresponding to the low speed circuit 2046), where the first transmission speed of the super speed circuit 202 is higher than the second transmission speed, the third transmission speed, and the fourth transmission speed. In addition, in Step 410, when the control module 206 turns off the super speed circuit 202 and turns on the non-super speed circuit 204, the control module 206 can also transmit a reset signal to the USB peripheral device 208. When the USB peripheral device 208 receives the reset signal, the USB peripheral device 208 first detects whether the super speed circuit 202 of the USB 3.0 host 200 is turned on, and then detects whether the non-super speed circuit 204 of the USB 3.0 host 200 is turned on according to the USB 3.0 specification. Then, because the super speed circuit 202 is turned off, the USB peripheral device 208 determines to utilize the non-super speed circuit 214 to perform the data transmission with the non-super speed circuit 204 of the USB 3.0 host 200. In addition, in Step 406 and Step 408, after the super speed circuit 202 is turned off, the control module 206 turns on the super speed circuit 202 again and transmits a reset signal to the USB peripheral device 208 when the transmission data quantity between the USB 3.0 host 200 and the USB peripheral device 208 is greater than the predetermined value again. When the USB peripheral device 208 receives the reset signal, the USB peripheral device 208 first detects whether the super speed circuit 202 of the USB 3.0 host 200 is turned on, and then detects whether the non-super speed circuit 204 of the USB 3.0 host 200 is turned on according to the USB 3.0 specification. Then, because the super speed circuit 202 is turned on, the USB peripheral device 208 determines to utilize the super speed circuit 212 to perform the data transmission with the super speed circuit 202 of the USB 3.0 host 200, and the control module 206 turns off the non-super speed circuit 204 again.

In addition, in another embodiment of the present invention, when the USB peripheral device 208 is a non-USB 3.0 peripheral device, the control module 206 controls the non-super speed circuit 204 of the USB 3.0 host 200 to communicate with the non-super speed circuit 214 of the USB peripheral device 208 through the second connection line 124 of the composite cable 120, and turns off the super speed circuit 202.

Figure 5:
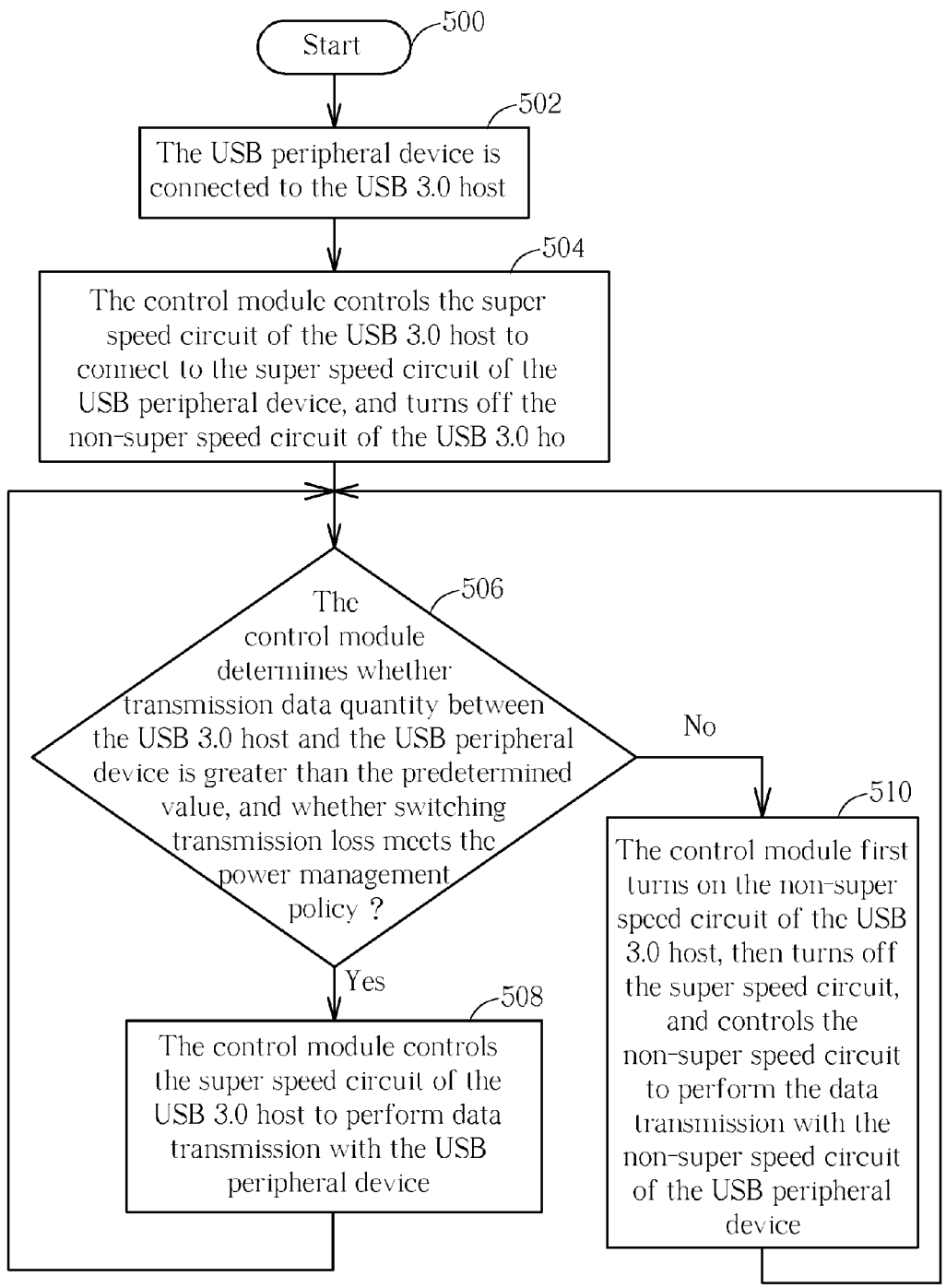
FIG. 5 is a flowchart illustrating a method for reducing power consumption of a USB 3.0 host according to another embodiment.

Please refer to FIG. 5. FIG. 5 is a flowchart illustrating a method for reducing power consumption of a USB 3.0 host according to another embodiment. The method in FIG. 5 is illustrated using the USB 3.0 host 200 and the USB peripheral device 208 in FIG. 3A. Detailed steps are as follows:

Step 500: Start.

Step 502: The USB peripheral device 208 is connected to the USB 3.0 host 200.

Step 504: The control module 206 controls the super speed circuit 202 of the USB 3.0 host 200 to connect to the super speed circuit 212 of the USB peripheral device 208.

Step 506: The control module 206 determines whether transmission data quantity between the USB 3.0 host 200 and the USB peripheral device 208 is greater than the predetermined value, and whether switching transmission loss meets the power management policy; if yes, go to Step 508; if no, go to Step 510.

Step 508: The control module 206 controls the super speed circuit 202 of the USB 3.0 host 200 to perform data transmission with the USB peripheral device 208; go to Step 506.

Step 510: The control module 206 first turns on the non-super speed circuit 204 of the USB 3.0 host 200, then turns off the super speed circuit 202, and controls the non-super speed circuit 204 to perform the data transmission with the non-super speed circuit 214 of the USB peripheral device 208; go to Step 506.

A difference between the embodiment in FIG. 5 and the embodiment in FIG. 4 is that in Step 506, the control module 206 not only determines whether transmission data quantity between the USB 3.0 host 200 and the USB peripheral device 208 is greater than the predetermined value, but also determines whether the switching transmission loss meets the power management policy. Therefore, when the switching transmission loss does not meet the power management policy, the control module 206 still maintains the present connection between the USB 3.0 host 200 and the USB peripheral device 208. In addition, subsequent operational principles of the embodiment in FIG. 5 are the same as those of the embodiment in FIG. 4, so further description thereof is omitted for simplicity.

To sum up, the USB 3.0 host with low power consumption and the method for reducing power consumption of a USB 3.0 host determine a connection between the USB peripheral device (the USB 3.0 peripheral device) and the USB 3.0 host to be a super speed transmission connection or a non-super speed transmission connection according to transmission data quantity between the USB peripheral device (the USB 3.0 peripheral device) and the USB 3.0 host, or according to the transmission data quantity between the USB peripheral device (the USB 3.0 peripheral device) and the USB 3.0 host, and switching transmission loss meeting the power management policy. In addition, when the non-super speed circuit of the USB peripheral device (the USB 3.0 peripheral device) is connected to the non-super speed circuit of the USB 3.0 host, the super speed circuit of the USB 3.0 host is turned off; and similarly, when the super speed circuit of the USB peripheral device (the USB 3.0 peripheral device) is connected to the super speed circuit of the USB 3.0 host, the non-super speed circuit of the USB 3.0 host is turned off. Thus, the USB 3.0 host can save much unnecessary power consumption.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A Universal Serial Bus (USB) 3.0 compatible host with lower operation power consumption, the USB 3.0 compatible host comprising:
a super speed circuit for transmitting data at a first transmission speed;
a non-super speed circuit for transmitting data at a second transmission speed, a third transmission speed, or a fourth transmission speed, wherein the first transmission speed is higher than the second transmission speed, the third transmission speed, and the fourth transmission speed;
a control circuit coupled to the super speed circuit and the non-super speed circuit for determining to turn on or off the super speed circuit of the USB 3.0 compatible host, during the USB 3.0 compatible host being connected to a USB 3.0 compatible peripheral device, based on whether transmission data quantity between the USB 3.0 compatible host and the USB 3.0 compatible peripheral device is greater than a predetermined value; and
wherein the control circuit further determines whether to keep controlling the super speed circuit to perform the data transmission with the USB 3.0 compatible peripheral device and turn off the non-super speed circuit, or to turn off the super speed circuit and control the non-super speed circuit to perform the data transmission with a USB 3.0 compatible peripheral device according to whether switching transmission loss between the USB 3.0 compatible host and the USB 3.0 compatible peripheral device meets a power management policy.

2. The USB 3.0 compatible host of claim 1, wherein the control circuit determining whether to keep controlling the super speed circuit to perform the data transmission with the USB 3.0 compatible peripheral device and turn off the non-super speed circuit, or to turn off the super speed circuit and control the non-super speed circuit to perform the data transmission with the USB 3.0 compatible peripheral device according to the transmission data quantity between the USB 3.0 compatible host and the USB 3.0 compatible peripheral device comprises one of the following:
when the transmission data quantity between the USB 3.0 compatible host and the USB 3.0 compatible peripheral device is lower than or equal to the predetermined value, the control circuit turns off the super speed circuit, and controls the non-super speed circuit to perform the data transmission with the USB 3.0 compatible peripheral device; and
when the transmission data quantity between the USB 3.0 compatible host and the USB 3.0 compatible peripheral device is greater than the predetermined value, the control circuit controls the super speed circuit to perform the data transmission with the USB 3.0 compatible peripheral device and turns off the non-super speed circuit.

3. The USB 2.0 compatible host of claim 2, wherein the control circuit transmits a reset signal to the USB 3.0 compatible peripheral device while the control circuit turns off the super speed circuit, and the USB 3.0 compatible peripheral device performs the data transmission with the non-super speed circuit according to the reset signal.

4. The USB 2.0 compatible host of claim 2, wherein after the super speed circuit is turned off, the control circuit turns on the super speed circuit again and transmits a reset signal to the USB 3.0 compatible peripheral device when the transmission data quantity between the USB 3.0 compatible host and the USB 3.0 compatible peripheral device is greater than the predetermined value again; wherein the USB 3.0 compatible peripheral device performs the data transmission with the super speed circuit again according to the reset signal.

5. A method for reducing power consumption of a USB 3.0 compatible host, wherein the USB 3.0 compatible host comprises a super speed circuit, a non-super speed circuit, and a control circuit, the method comprising:
initially connecting a USB 3.0 compatible peripheral device to the USB 3.0 compatible host;
the control circuit controlling the super speed circuit to connect to perform data transmission with the USB 3.0 compatible peripheral device;
the control circuit determining to turn on or off the super speed circuit of the USB 3.0 compatible host, during the USB 3.0 compatible host being connected to the USB 3.0 compatible peripheral device, based on whether transmission data quantity between the USB 3.0 compatible host and the USB 3.0 compatible peripheral device is greater than a predetermined value; and
the control circuit further determining whether to keep controlling the super speed circuit to perform the data transmission with the USB 3.0 compatible peripheral device and turn off the non-super speed circuit, or to turn off the super speed circuit and control the non-super speed circuit to perform the data transmission with a USB 3.0 compatible peripheral device according to whether switching transmission loss between the USB 3.0 compatible host and the USB 3.0 compatible peripheral device meets a power management policy.

6. The method of claim 5, wherein the control circuit determining whether to keep controlling the super speed circuit to perform the data transmission with the USB 3.0 compatible peripheral device and turn off the non-super speed circuit, or to turn off the super speed circuit and control the non-super speed circuit to perform the data transmission with the USB 3.0 compatible peripheral device according to the transmission data quantity between the USB 3.0 compatible host and the USB 3.0 compatible peripheral device comprises one of the following:

when the transmission data quantity between the USB 3.0 compatible host and the USB 3.0 compatible peripheral device is lower than or equal to the predetermined value, the control circuit turning off the super speed circuit, and controlling the non-super speed circuit to perform the data transmission with the USB 3.0 compatible peripheral device; and when the transmission data quantity between the USB 3.0 compatible host and the USB 3.0 compatible peripheral device is greater than the predetermined value, the control circuit controlling the super speed circuit to perform the data transmission with the USB 3.0 compatible peripheral device and turning off the non-super speed circuit.

7. The method of claim 6, wherein the control circuit transmits a reset signal to the USB 3.0 compatible peripheral device while the control circuit turns off the super speed circuit, and the USB 3.0 compatible peripheral device performs the data transmission with the non-super speed circuit according to the reset signal.

8. The method of claim 6, wherein after the super speed circuit is turned off, the control circuit turns on the super speed circuit again and transmits a reset signal to the USB 3.0 compatible peripheral device when the transmission data quantity between the USB 3.0 compatible host and the USB 3.0 compatible peripheral device is greater than the predetermined value again; wherein the USB 3.0 compatible peripheral device performs the data transmission with the super speed circuit again according to the reset signal.

9. A method for reducing power consumption of a USB 3.0 compatible host, wherein the USB 3.0 compatible host comprises a super speed circuit, a non-super speed circuit, and a control circuit, the method comprising:

initially connecting a USB 3.0 compatible peripheral device to the USB 3.0 compatible host;

the control circuit controlling the super speed circuit to connect to perform data transmission with the USB 3.0 compatible peripheral device;

the control circuit determining to turn on or off the super speed circuit of the USB 3.0 compatible host, during the USB 3.0 compatible host being connected to the USB 3.0 compatible peripheral device, based on whether switching transmission loss between the USB 3.0 compatible host and the USB 3.0 compatible peripheral device meets a power management policy, and whether transmission data quantity between the USB 3.0 compatible host and the USB 3.0 compatible peripheral device is greater than a predetermined value;

wherein the control circuit determining whether to keep controlling the super speed circuit to perform the data transmission with the USB 3.0 compatible peripheral device and turn off the non-super speed circuit, or to turn off the super speed circuit and control the non-super speed circuit to perform the data transmission with the USB 3.0 compatible peripheral device according to whether the switching transmission loss between the USB 3.0 compatible host and the USB 3.0 compatible peripheral device meets the power management policy comprises one of the following:

when the switching transmission loss meets the power management policy, the control circuit turning off the super speed circuit and controlling the non-super speed circuit to perform the data transmission with the USB 3.0 compatible peripheral device; and when the switching transmission loss fails to meet the power management policy, the control circuit turning off the non-super speed circuit and controlling the super speed circuit to perform the data transmission with the USB 3.0 compatible peripheral device.

10. The method of claim 9, wherein the control circuit transmits a reset signal to the USB 3.0 compatible peripheral device while the control circuit turns off the super speed circuit, and the USB 3.0 compatible peripheral device performs the data transmission with the non-super speed circuit according to the reset signal.

11. The method of claim 9, wherein after the super speed circuit is turned off, the control circuit turns on the super speed circuit again and transmits a reset signal to the USB 3.0 compatible peripheral device when the switching transmission loss fails to meet the power management policy again; wherein the USB 3.0 compatible peripheral device performs the data transmission with the super speed circuit again according to the reset signal.

12. A Universal Serial Bus (USB) 3.0 compatible host with lower operation power consumption, the USB 3.0 compatible host comprising:

a super speed circuit for transmitting data at a first transmission speed;

a non-super speed circuit for transmitting data at a second transmission speed, a third transmission speed, or a fourth transmission speed, wherein the first transmission speed is higher than the second transmission speed, the third transmission speed, and the fourth transmission speed;

a control circuit coupled to the super speed circuit and the non-super speed circuit for determining to turn on or off the super speed circuit of the USB 3.0 compatible host, during the USB 3.0 compatible host being connected to a USB 3.0 compatible peripheral device, based on whether switching transmission loss between the USB 3.0 compatible host and the USB 3.0 compatible peripheral device meets a power management policy, and whether transmission data quantity between the USB 3.0 compatible host and the USB 3.0 compatible peripheral device is greater than a predetermined value;

wherein the control circuit determining whether to keep controlling the super speed circuit to perform the data transmission with the USB 3.0 compatible peripheral device and turn off the non-super speed circuit, or to turn off the super speed circuit and control the non-super speed circuit to perform the data transmission with the USB 3.0 compatible peripheral device according to whether the switching transmission loss between the USB 3.0 compatible host and the USB 3.0 compatible peripheral device meets the power management policy comprises one of the following:

when the switching transmission loss meets the power management policy, the control circuit turns off the super speed circuit and controls the non-super speed circuit to perform the data transmission with the USB 3.0 compatible peripheral device; and when the switching transmission loss fails to meet the power management policy, the control circuit turns off the non-super speed circuit and controls the super speed circuit to perform the data transmission with the USB 3.0 compatible peripheral device.

13. The USB 12.0 compatible host of claim 12, wherein the control circuit transmits a reset signal to the USB 3.0 compatible peripheral device while the control circuit turns off the super speed circuit, and the USB 3.0 compatible peripheral device performs the data transmission with the non-super speed circuit according to the reset signal.

14. The USB 12.0 compatible host of claim 12, wherein after the super speed circuit is turned off, the control circuit turns on the super speed circuit again and transmits a reset signal to the USB 3.0 compatible peripheral device when the switching transmission loss fails to meet the power management policy again; wherein the USB 3.0 compatible peripheral device performs the data transmission with the super speed circuit again according to the reset signal.

* * * * *